United States Patent
Salehi et al.

(10) Patent No.: US 9,939,275 B1
(45) Date of Patent: Apr. 10, 2018

(54) METHODS AND SYSTEMS FOR GEOMETRICAL OPTICS POSITIONING USING SPATIAL COLOR CODED LEDS

(71) Applicants: Jawad A. Salehi, Tehran (IR); Hamid Hosseinianfar, Charlottesville, VA (US); Ata Chizari, Tehran (IR)

(72) Inventors: Jawad A. Salehi, Tehran (IR); Hamid Hosseinianfar, Charlottesville, VA (US); Ata Chizari, Tehran (IR)

(*) Notice: Subject to any disclaimer, the term of this patent is extended or adjusted under 35 U.S.C. 154(b) by 0 days.

(21) Appl. No.: 15/275,431

(22) Filed: Sep. 25, 2016

(51) Int. Cl.
| | |
|---|---|
| *H04B 10/116* | (2013.01) |
| *G01C 21/20* | (2006.01) |
| *H04W 4/02* | (2018.01) |
| *G01S 5/16* | (2006.01) |
| *G01P 15/18* | (2013.01) |
| *G06T 7/70* | (2017.01) |
| *H04N 7/18* | (2006.01) |

(52) U.S. Cl.
CPC ............ *G01C 21/206* (2013.01); *G01P 15/18* (2013.01); *G01S 5/16* (2013.01); *G06T 7/70* (2017.01); *H04N 7/183* (2013.01); *H04W 4/02* (2013.01); *G06T 2207/10024* (2013.01); *G06T 2207/30244* (2013.01)

(58) Field of Classification Search
CPC ....... G01C 21/206; H04N 7/183; G01P 15/18; G01S 5/16; H04W 4/02; G06T 7/70; G06T 2207/10024; G06T 2207/30244
See application file for complete search history.

(56) References Cited

U.S. PATENT DOCUMENTS

| | | | |
|---|---|---|---|
| 8,752,761 B2 | 6/2014 | Calvaresse et al. | |
| 2014/0084050 A1* | 3/2014 | Calvarese | G01C 21/206 235/375 |
| 2014/0086590 A1* | 3/2014 | Ganick | G06Q 30/02 398/118 |
| 2014/0280316 A1 | 9/2014 | Ganick et al. | |
| 2017/0187454 A1* | 6/2017 | Zhang | H04B 10/116 |

* cited by examiner

*Primary Examiner* — Qian Yang

(57) ABSTRACT

A method and system of indoor positioning associated with a smartphone includes installing one or more color LED identifiers on a ceiling associated with an indoor location and dividing the indoor location based on the one or more color LED identifiers into one or more cells. One or more images of the one or more color LED identifiers are captured through a camera associated with the smartphone. Further, accelerometer data associated with the smartphone is captured onto a memory associated with the smartphone. The accelerometer data and captured images are transmitted over a computer network to a computer processor and one or more of a location (two dimensional and/or three dimensional) in one or more cells, azimuth and tilt associated with the smartphone are calculated through closed form equations. The location of the smartphone is determined within the cell based on an identified cell of the one or more cells.

15 Claims, 17 Drawing Sheets

| Dimension | Azimuth (deg.) | Tilt (deg.) | Average Error (cm) | Potential Applications |
|---|---|---|---|---|
| 2-D | 90 (fixed) | 0 | 0.54 | Hospital wheelchairs and robots |
| 3-D | 0 | 0 | 1.24 | Realistic positioning applications on smartphones |
| | 275 | 0 | 1.85 | |
| | 275 | 35 | 6.02 | |

FIG. 15

METHODS AND SYSTEMS FOR GEOMETRICAL OPTICS POSITIONING USING SPATIAL COLOR CODED LEDS

BACKGROUND OF THE INVENTION

There are several ways for a handheld device such as a mobile phone or a tablet computer to determine its location. Conventional techniques include the use of a satellite-based positioning system such as GPS (Global Positioning System), or triangulation based on alteration in signals communicated between the mobile device and a plurality of base stations of a cellular network.

Various approaches have been proposed for indoor positioning systems including radio frequency (RF) based approaches, which are prone to have errors of tens of meters and they typically estimate two-dimensional position. Optical based solutions were introduced to address such challenges. However, the optical based systems were either not comprehensive or do not calculate positions accurately. U.S. Pat. Nos. 8,248,467, 8,334,901, 8,957,951 and 8,436,896 discloses optical indoor positioning systems using CMOS camera and Wi-Fi technology, which may be implemented on smartphones. The proposed positioning techniques include modulation and demodulation of unique codes generated by LED transmitters.

Firstly, using a CMOS camera to estimate the position is both expensive and challenging to be implemented on ordinary smartphones. Secondly, their accuracy is in the order of several decimeters, which is not appropriate for accurate indoor positioning applications. Further, some other optical techniques for indoor positioning estimate two dimensional positioning with two or more reference points. These systems have a large error exposure. For two-dimensional positioning, image sensor is expected to be horizontal and to have a pre-determined inclination. Therefore, there is a need in the art for a solution to the aforementioned problems.

SUMMARY OF THE INVENTION

The present invention relates to a system and method for geometrical optics positioning using spatial color-coded light emitting diodes (LEDs). Disclosed are methods, an apparatus, and systems for geometrical optics positioning using spatial color coded LEDs.

In one aspect, a method of indoor positioning associated with a smartphone includes installing one or more color LED identifiers on the ceiling associated with an indoor location and dividing the indoor location based on the one or more color LED identifiers into one or more cells. One or more images of the one or more color LED identifiers are captured through a typical low resolution (e.g. 480×640 pixels) camera associated with the smartphone. Further, accelerometer data associated with the smartphone is captured onto a memory associated with the smartphone. One or more of the accelerometer data and captured images are transmitted over a computer network to a computer processor (or to a modern smartphone) and one or more of a location in one or more cells, azimuth and tilt associated with the smartphone are calculated through closed form equations. The location of the smartphone is determined within the cell based on an identified cell of the one or more cells.

In another aspect, an indoor localization system comprises one or more color LEDs and a smartphone associated with a camera, an accelerometer and a processor. The LEDs/lighting fixture are installed on the ceiling of an indoor location. The indoor location is divided based on the one or more color LED identifiers into one or more cells. One or more images of the one or more color LED identifiers is captured through the camera associated with the smartphone. Accelerometer data associated with the smartphone is captured onto a memory associated with the smartphone. One or more of the accelerometer data and captured images are transmitted over a computer network to a computer processor. One or more of a location in one or more cells, azimuth and tilt associated with the smartphone are calculated and the location of the smartphone within the cell is determined based on an identified cell of the one or more cells.

In yet another aspect, a method of indoor positioning associated with a smartphone includes installing one or more color LED identifiers on the ceiling associated with an indoor location and dividing the indoor location based on the one or more color LED identifiers into one or more cells. One or more images of the one or more color LED identifiers are captured through a camera associated with the smartphone at predetermined intervals. Further, accelerometer data associated with the smartphone is captured onto a memory associated with the smartphone. One or more of the accelerometer data and captured images are transmitted over a computer network to a computer processor. The computer processor calculates one or more of a location in one or more cells, azimuth and tilt associated with the smartphone. The calculation by the computer processor may be performed through closed form equations. The calculation leads to identification of a cell. The location of the smartphone is determined within the cell based on an identified cell of the one or more cells.

One aspect of the present disclosure is directed to an indoor localization system comprising: one or more color light emitting diodes (LEDs), wherein the one or more LEDs are installed on the ceiling of an indoor location; a smartphone associated with at least one of a camera, an accelerometer and a processor, wherein the indoor location is divided based on the one or more color LED identifiers into one or more cells, wherein one or more images of the one or more color LED identifiers is captured through the camera associated with the smartphone; wherein accelerometer data associated with the smartphone is captured onto a memory associated with the smartphone; wherein at least one of the accelerometer data and captured images are transmitted over a computer network to a computer processor; wherein at least one of a location in one or more cells, azimuth and tilt associated with the smartphone are calculated; and wherein the location of the smartphone within the cell is determined based on an identified cell of the one or more cells.

In one embodiment, a two dimensional positioning is based on one LED. In another embodiment, a three dimensional positioning is based on two or more light emitting diodes. In one embodiment, the one or more light emitting diodes are reference points. In one embodiment, the images are captured through the camera at predetermined intervals. In one embodiment, an error in location of the smartphone is less than 6 centimeters.

One aspect of the present disclosure is directed to a method of indoor localization associated with a smartphone comprising: installing one or more color LED identifiers on the ceiling associated with an indoor location; dividing the indoor location based on the one or more color LED identifiers into one or more cells; capturing one or more images of the one or more color LED identifiers through a camera associated with the smartphone; capturing accelerometer data associated with the smartphone onto a memory associated with the smartphone; transmitting at least one of the accelerometer data and captured images over a computer network to a computer processor; calculating at least one of a location (e.g. X, Y, and Z parameters of the smartphone location, in Cartesian space) in one or more cells, azimuth and tilt associated with the smartphone; and determining the location of the smartphone within the cell based on an identified cell of the one or more cells.

In one embodiment, the images are captured through the camera at a predetermined interval. In another embodiment, a two dimensional positioning is based on one LED. In one embodiment, a three dimensional positioning is based on two or more LEDs. In one embodiment, the one or more light emitting diodes are reference points. In one embodiment, an error in the location of the smartphone is less than 6 centimeters.

One aspect of the present disclosure is directed to a method of indoor positioning associated with a smartphone comprising: installing one or more color LED identifiers on the ceiling associated with an indoor location; dividing the indoor location based on the one or more color LED identifiers into one or more cells; capturing one or more images of the one or more color LED identifiers through a camera associated with the smartphone; capturing accelerometer data associated with the smartphone onto a memory associated with the smartphone; transmitting at least one of the accelerometer data and captured images over a computer network to a computer processor; calculating, through the computer processor, at least one of a location in one or more cells, azimuth and tilt associated with the smartphone, wherein the computer processor calculates at least one of a location in one or more cells, azimuth and tilt associated with the smartphone through closed form equations; and determining the 2D or 3D location of the smartphone within the cell based on an identified cell of the one or more cells, wherein an error in the determined location is less than 6 centimeters In one embodiment, the images are captured through the camera at a predetermined interval. In another embodiment, a two dimensional positioning is based on LED. In one embodiment, a three dimensional positioning is based on two or more light emitting diodes. In one embodiment, the one or more LEDs are reference points. In one embodiment, azimuth is calculated based on the accelerometer data. In one embodiment, the tilt is calculated based on the captured images. In another embodiment, the azimuth is calculated based on the captured images. In one embodiment, the title is calculated based on the accelerometer data. In one embodiment, the azimuth and tilt are calculated based on the captured images and the accelerometer data.

Another aspect of the present disclosure is directed to a method of determining the three dimensional position of a smartphone to within three inches of the actual position of the smartphone in a building, said method comprising: installing one or more color LED identifiers on one or more walls or ceiling inside said building; based on one or more color LED identifiers, dividing an indoor location into one or more cells; capturing one or more images of the one or more color LED identifiers through a camera associated with the smartphone; capturing accelerometer data associated with the smartphone onto a memory associated with the smartphone; transmitting at least one of the accelerometer data and captured images over a computer network to a computer processor; calculating, through the computer processor, at least one location in one or more cells, azimuth and tilt associated with the smartphone, wherein the computer processor calculates at least one location in one or more cells, azimuth and tilt associated with the smartphone through closed form equations; and determining the three dimensional position of the smartphone within the cell based on an identified cell of the one or more cells, wherein an error in the determined location is less than 6 centimeters.

In one embodiment, a three dimensional positioning is based on two or more LEDs; wherein the one or more LEDs are reference points; wherein azimuth is calculated based on the accelerometer data; and further wherein the tilt is calculated based on the captured images.

Other objects and advantages of the embodiments herein will become readily apparent from the following detailed description taken in conjunction with the accompanying drawings. The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not as limitation in the figures of the accompanying drawings, in which like references indicate similar elements and in which:

According to one embodiment

According to one embodiment where the system performance was evaluated caused by azimuth.

FIG. 15 illustrates the system performance and applications, as according to one embodiment.

Figure 1:
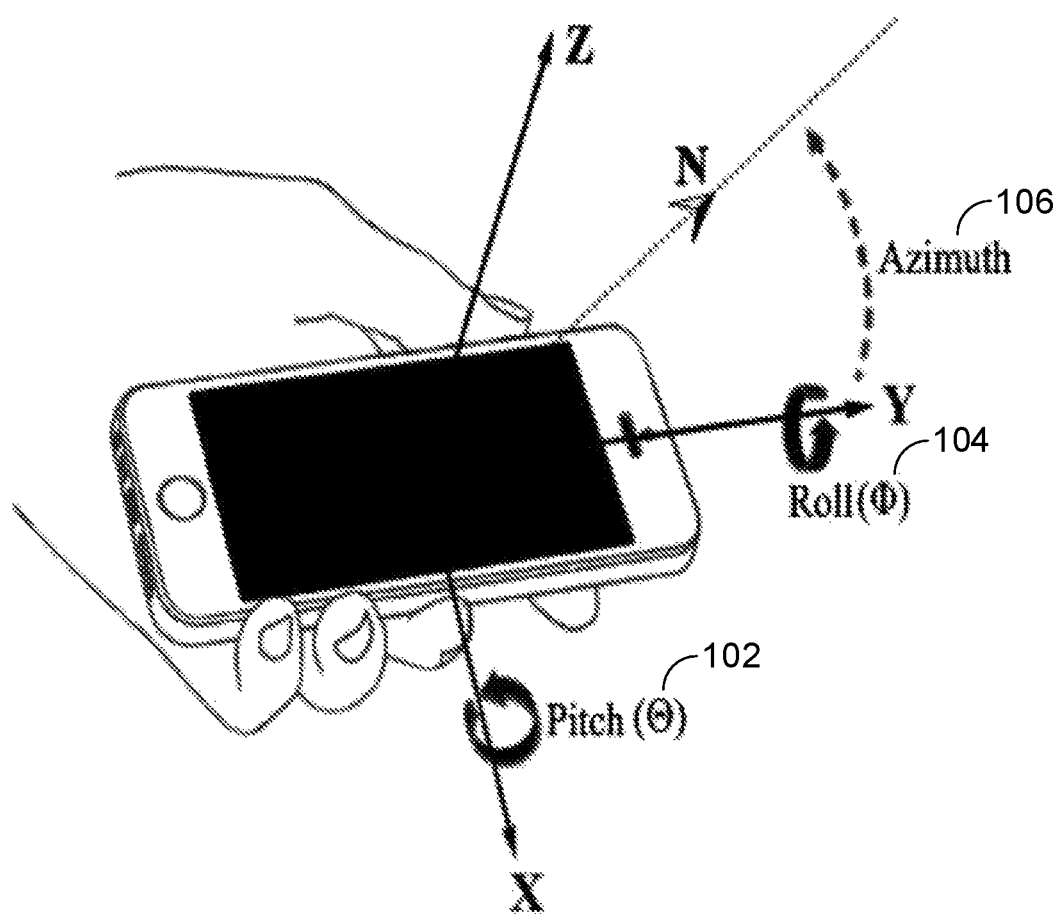
FIG. 1 illustrates a smartphone inclination, according to one or more embodiments.

Other features of the present embodiments will be apparent from the accompanying drawings and from the detailed description that follows.

DETAILED DESCRIPTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Example embodiments, as described below, may be used to provide methods, an apparatus and/or systems for geometrical optics positioning using spatial color-coded LEDs. Although the present embodiments have been described with reference to specific example embodiments, it will be evident that various modifications and changes may be made to these embodiments without departing from the broader spirit and scope of the invention.

The ever increasing demand for location-based services has raised the necessity of indoor positioning systems. Indoor positioning systems may have many applications, such as automatic robot control or user guidance to a product in a shopping center. Some important parameters for an indoor positioning system may include accuracy, simplicity, and system comprehensiveness.

In one or more embodiments, a three dimensional position of the smartphone may be estimated through a geometrical positioning system. The system may measure the smartphone azimuth angle via an image processing technique.

Most of the current solutions to address the problems associated with indoor positioning do not consider practical challenges such as smart-phone's inclination (tilt) resulting from users' hand gesture. However, the proposed solution is based on smartphones estimating smartphone tilt, using an accelerometer and closed form equations. The closed form equation is a mathematical equation that may be evaluated in a finite number of operations.

In one or more embodiments, a positioning environment may be divided into a plurality of cells, wherein each cell may be associated with a unique color-coded layout of unmodulated LEDs. Thus, the LEDs may be simultaneously modulated for VLC applications.

In one or more embodiments, an orientation of a mobile device or a smartphone may be defined as a combination of three angular quantities: Azimuth, pitch and roll.

In one or more embodiments, the smartphone may send captured images and acceleration data to a computer. After processing input data (the captured images and the acceleration data), the computer may output six parameters. In this context, the parameters that determine the smartphone position include X, Y, and Z in the Cartesian space, and the parameters related to the smartphone status which include the smartphone's azimuth, roll and pitch.

In one or more embodiments, a positioning system may be associated with a smartphone as a locator, and color LED identifiers. The smartphone may estimate the smartphone's location based on the color LED identifiers.

In one or more embodiments, an indoor area may be divided into one or more cells. Each cell may have a unique code determined by a layout of color LEDs installed on the ceiling. A smartphone may be associated with a camera, an accelerometer, and a processor. The camera may be faced to the ceiling and images may be captured periodically. The captured images may be used to define a position of the smartphone.

In one or more embodiments, indoor positioning systems may be associated with industrial applications such as advertisements in large shopping malls.

In one or more embodiments, a method and system of indoor positioning may require one reference point for two dimensional positioning and two reference points for three dimensional positioning. The system may include color LED identifiers installed on the ceiling. The color LED identifiers may be used as a reference point for location estimation and/or unique layout in each cell. The unique layout may be used to define a cell number under which a smartphone may be located. The system may further include a camera for capturing images from color LED identifiers installed on the ceiling.

Still further, the system may include an accelerometer for gathering acceleration data in order to estimate the applied tilt (roll or pitch) of the smartphone. The system may also include a central processor for calculation and estimation of positioning parameters, namely, X, Y, Z, Azimuth, roll, and pitch of the smartphone.

In one or more embodiments, a method of indoor positioning associated with the smartphone may include installing one or more color LED identifiers on the ceiling associated with an indoor location and dividing the indoor location based on the one or more color LED identifiers into one or more cells. One or more images of the one or more color LED identifiers may be captured through a camera associated with the smartphone. Further, accelerometer data associated with the smartphone may be captured onto a memory associated with the smartphone. One or more of the accelerometer data and captured images may be transmitted over a computer network to a computer processor and one or more of a location in one or more cells, azimuth and tilt associated with the smartphone are calculated through closed form equations. The location of the smartphone may be determined within the cell based on an identified cell of the one or more cells.

In one or more embodiments, an indoor localization system may comprise one or more color light emitting diodes (LEDs) and a smartphone associated with at least one of a camera, an accelerometer and a processor. The one or more LEDs may be installed on the ceiling of an indoor location. The indoor location may be divided based on the one or more color LED identifiers into one or more cells. One or more images of the one or more color LED identifiers may be captured through the camera associated with the smartphone. Accelerometer data associated with the smartphone may be captured onto a memory associated with the smartphone. One or more of the accelerometer data and captured images may be transmitted over a computer network to a computer processor. One or more of a location in one or more cells, azimuth and tilt associated with the smartphone may be calculated and the location of the smartphone within the cell is determined based on an identified cell of the one or more cells.

In one or more embodiments, indoor positioning associated with a smartphone may include installing one or more color LED identifiers on the ceiling associated with an indoor location and dividing the indoor location based on the one or more color LED identifiers into one or more cells. One or more images of the one or more color LED identifiers may be captured through a camera associated with the smartphone at predetermined intervals. Further, accelerometer data associated with the smartphone may be captured onto a memory associated with the smartphone. One or more of the accelerometer data and captured images may be transmitted over a computer network to a computer processor. The computer processor calculates one or more of a location in one or more cells, azimuth and tilt associated with the smartphone. Further, the computer processor may calculate location through closed form equations. The calculation may lead to identification of a cell. The location of the smartphone may be determined within the cell based on an identified cell of the one or more cells.

FIG. 1 illustrates a smartphone inclination, according to one or more embodiments. A rotation of a camera associated with a smartphone on the horizontal plane (xy plane) is known as azimuth 106 or orientation, and the smartphone rotations around x-axis and y-axis are denoted as pitch 102 and roll 104, respectively.

A spatial color code landmark may be defined as a set of color LEDs that constitute a unique spatial identifier of a positioning cell. Local positioning may be a calculation of the positioning parameters inside a landmark's cell. In addition, finding the cell in which the smartphone is located is called global positioning. Moreover, the Cartesian coordinate system axes of the camera and the real world are called camera coordinate system axes and room coordinate system axes, respectively.

In one or more embodiments, an indoor positioning system may consist of colored LED landmarks and a smartphone equipped with an accelerometer and a front-facing camera. Each landmark may include a set of color-coded LEDs, namely red, green, and blue. The set of color-coded LEDs may create a spatial identifier of the corresponding landmark.

Figure 2:
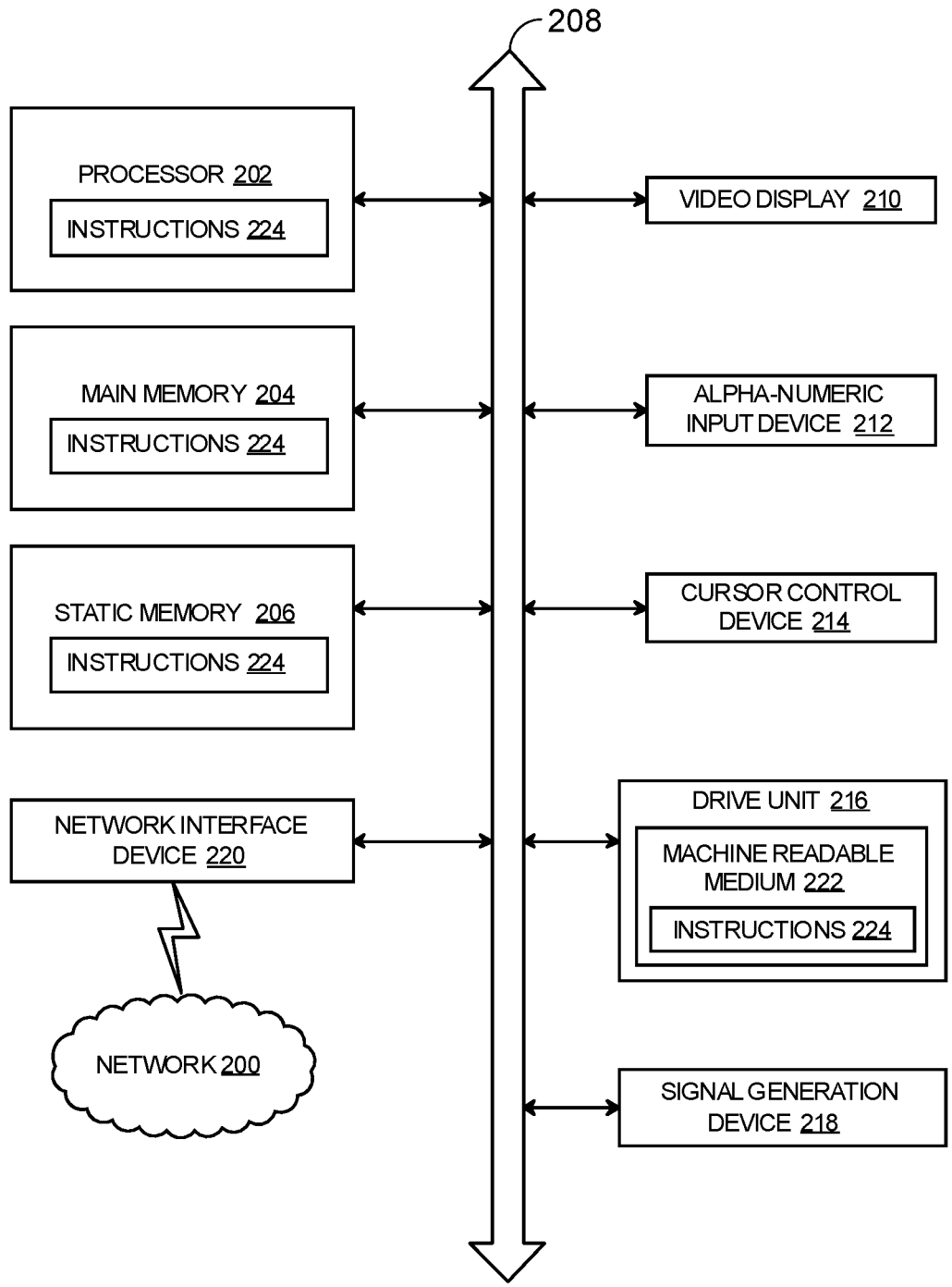
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

One aspect of the present disclosure is directed to a method of indoor localization associated with a smartphone. The method comprises installing one or more color LED identifiers on the ceiling associated with an indoor location; dividing the indoor location based on the one or more color LED identifiers into one or more cells; capturing one or more images of the one or more color LED identifiers through a camera associated with the smartphone; and capturing accelerometer data associated with the smartphone onto a memory associated with the smartphone. The method further comprises then transmitting at least one of the accelerometer data and captured images, or both the accelerometer data and captured images, over a computer network to a computer processor. This processor can even be a modern smartphone. The computer processor then calculates at least one of locations in one or more cells, azimuth and tilt associated with the smartphone. Based on this calculation, the location of the smartphone is determined within the cell based on an identified cell of the one or more cells.

Another aspect of the present disclosure is directed to a method of indoor positioning associated with a smartphone. The method comprises installing one or more color LED identifiers on the ceiling associated with an indoor location; and dividing the indoor location based on the one or more color LED identifiers into one or more cells. The method further comprises capturing one or more images of the one or more color LED identifiers through a camera associated with the smartphone; and capturing accelerometer data associated with the smartphone onto a memory associated with the smartphone. As a further step, the method includes transmitting at least one of the accelerometer data and captured images over a computer network to a computer processor; and calculating, through the computer processor, at least one of a location in one or more cells, azimuth and tilt associated with the smartphone. The computer processor can calculate at least one of the locations in one or more cells, azimuth and tilt associated with the smartphone through closed form equations. Based on the results, one can determine the location of the smartphone within the cell based on an identified cell of the one or more cells, such that an error in the determined location can be less than 6 centimeters.

The images may be captured through the camera at a predetermined interval. A two dimensional positioning may be based on one LEDs. A three dimensional positioning may be based on two or more LEDs. The one or more LEDs may act as reference points. Azimuth may be calculated based on the accelerometer data. The tilt may be calculated based on the captured images. An error in the location of the smartphone may be less than 6 centimeters. In one example, a three dimensional positioning may be based on two or more LEDs; the one or more LEDs act as reference points; azimuth is calculated based on the accelerometer data; and further the tilt is calculated based on the captured images.

The example computer system 200 includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 constituting machine-readable media.

The instructions 224 may further be transmitted and/or received over a network via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 3:
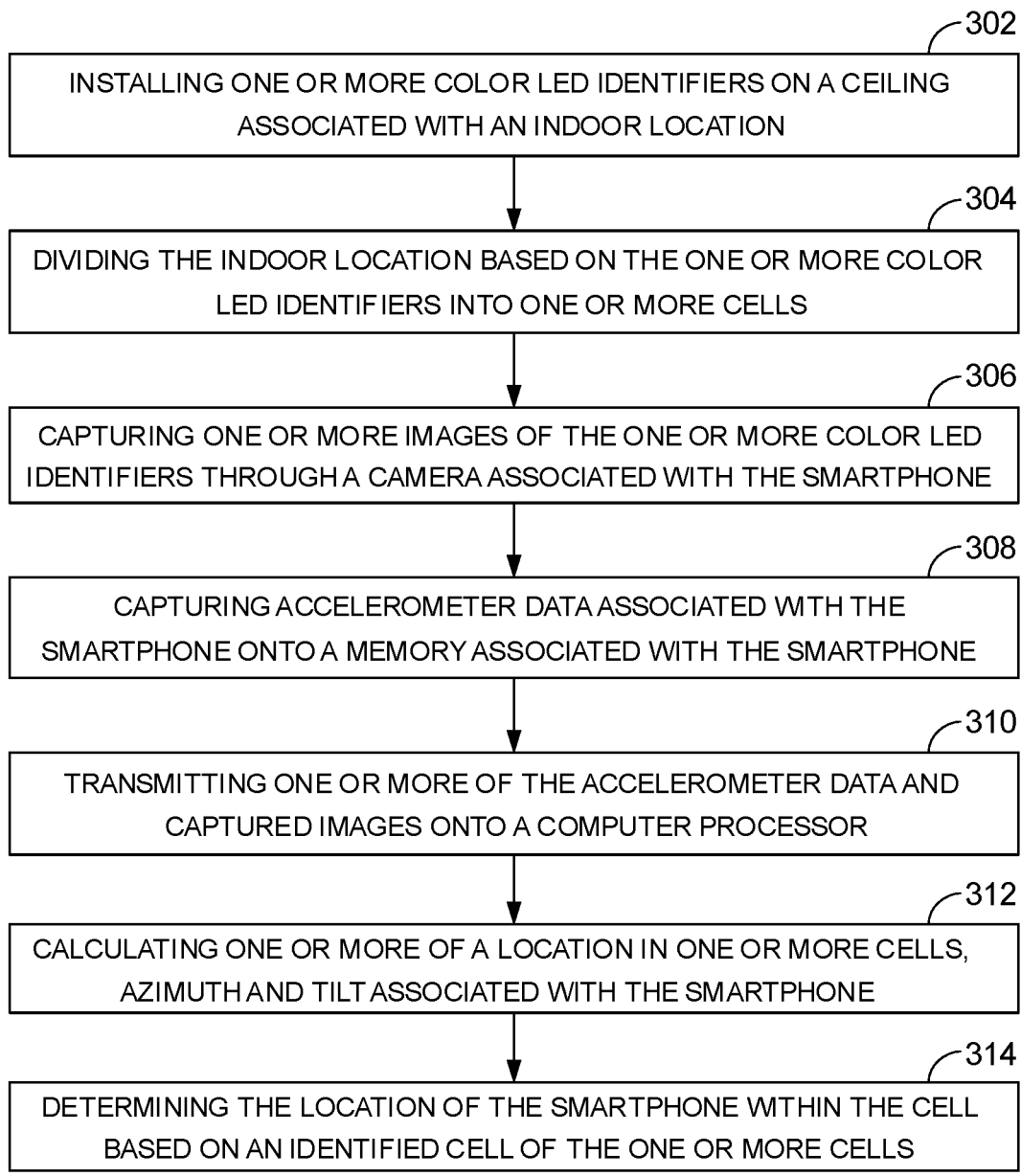
FIG. 3 illustrates a process flow diagram detailing the steps of indoor localization of a smartphone, according to an embodiment of the present invention.

FIG. 3 illustrates a process flow diagram detailing the steps of indoor localization of a smartphone, according to an embodiment of the present invention.

In one or more embodiments, a method of indoor positioning associated with a smartphone may include installing one or more color LED identifiers on the ceiling associated with an indoor location, as shown in step 302 and dividing the indoor location based on the one or more color LED identifiers into one or more cells, as shown in step 304. One or more images of the one or more color LED identifiers may be captured through a camera associated with the smartphone, as shown in step 306. Further, accelerometer data associated with the smartphone may be captured onto a memory associated with the smartphone, as shown in step 308. One or more of the accelerometer data and captured images may be transmitted over a computer network to a computer processor, as shown in step 310 and one or more of a location in one or more cells, azimuth and tilt associated with the smartphone are calculated through closed form equations, as shown in step 312. The location of the smartphone may be determined within the cell based on an identified cell of the one or more cells, as shown in step 314.

Another aspect of the present disclosure is directed to a method of determining the three dimensional position of a smartphone to within three inches of the actual position of the smartphone inside a building. The method comprises installing one or more color LED identifiers on one or more walls or ceiling inside said building; and based on one or more color LED identifiers, dividing an indoor location into one or more cells. The method further comprises capturing one or more images of the one or more color LED identifiers through a camera associated with the smartphone; and capturing accelerometer data associated with the smartphone onto a memory associated with the smartphone. Once captured images and data are obtained, they are transmitted over a computer network to a computer processor. The computer processor then calculates at least one location in one or more cells, azimuth and tilt associated with the smartphone. The computer processor can calculate at least one location in one or more cells, azimuth and tilt associated with the smartphone through closed form equations. As a final step of the method, the three dimensional position of the smartphone within the cell is determined based on an identified cell of the one or more cells. The error in the determined location may be less than 6 centimeters.

Figure 4:
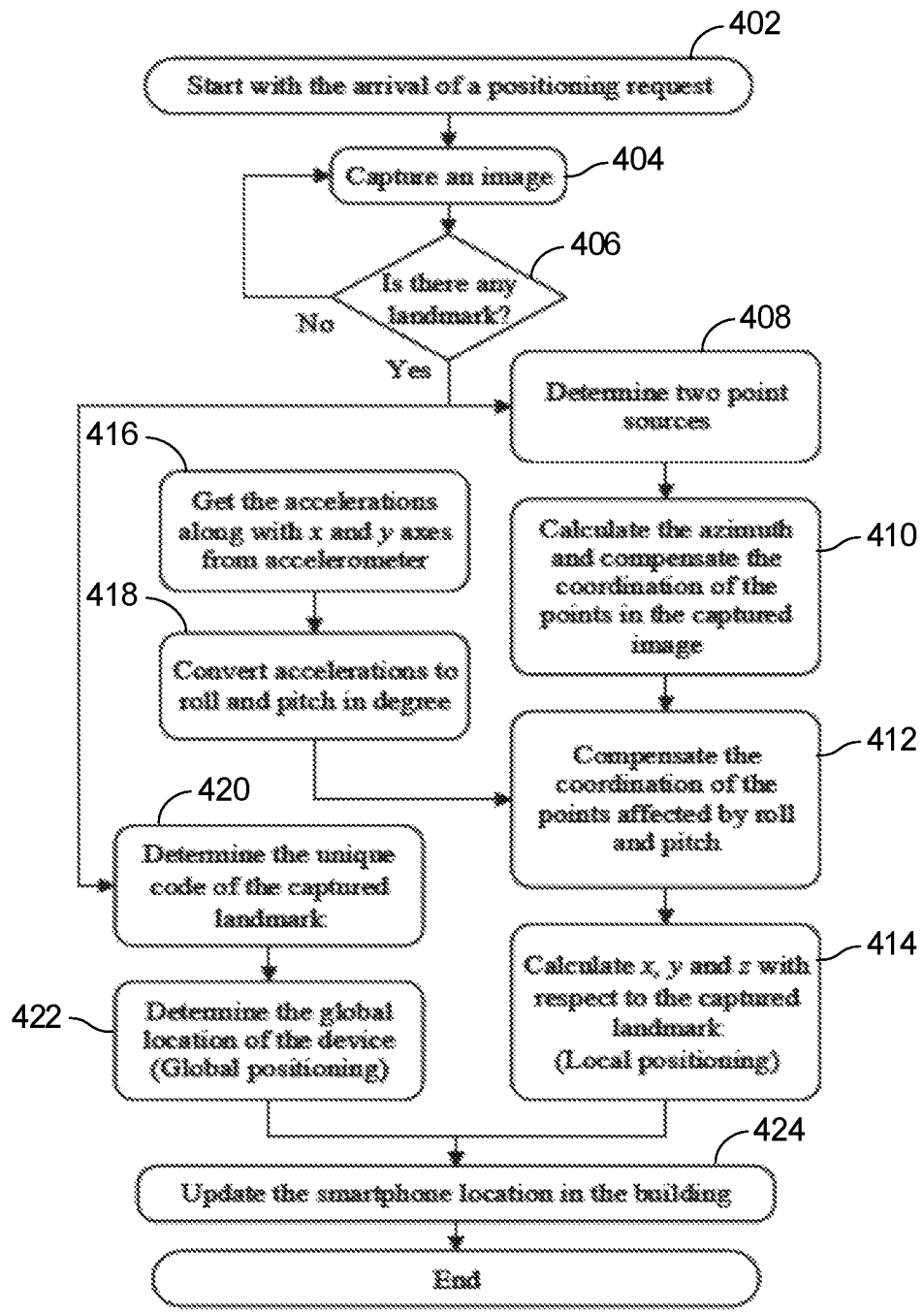
FIG. 4 is a flow chart illustrating the steps involved in finding the location of smartphone within a building, according to one example embodiment.

FIG. 4 is a flow chart illustrating steps involved in finding the location of smartphone within a building, according to one example embodiment. A positioning request may be received from a smartphone, as shown in step 402. First, each positioning device such as a smartphone may estimate the smartphone's position with respect to a landmark. Afterward, the smartphone may detect the corresponding landmark's code to find the smartphone's position in a larger scale. The previous two steps may be called local positioning and global positioning, respectively.

In local positioning, a front-facing camera of the smartphone may continuously take pictures, as shown in step 404. Initially, the algorithm may check whether there is any landmark in an image, as shown in step 406. In case the landmark exists, a simple image-processing algorithm may be employed in order to extract the landmark's unique color code, as shown in step 420 and derive coordinates of two reference points in the landmark, as shown in step 408. Further, a global position of the smartphone may be determined, as shown in step 422. In order to find the distance of the smartphone from the captured landmark, the indoor positioning algorithm may check whether the smartphone has a non-zero azimuth and considers the azimuth in the positioning calculation. The azimuth may be calculated and the coordination of points in the captured image may be compensated, as shown in step 410. Accelerometer data associated with the smartphone may provide accelerations along x and y-axes, as shown in step 416. The accelerations may be converted into roll and pitch in degree measures, as shown in step 418. Further, coordination of points affected by pitch and roll may be compensated, as shown in step 412. Local positioning may include calculations along different axes. Such as a calculation of x, y, and z with respect to the captured landmark can be done, as shown in step 414. Based on the calculation, the smartphone's location may be updated, as shown in step 424.

In one or more embodiments, a 2-D positioning algorithm may assume that the camera has zero tilt and zero azimuth. Further, the algorithm may also assume that both the room and camera's Cartesian coordinate systems are the same. Given that rays passing through a center of a biconvex lens exit in a same direction, the projection of LEDs on an image plane (detector's area) may be collinear with LEDs and the center of biconvex lens.

In one or more embodiments, to perform 3-D positioning, extraction of two point sources' coordinates in the captured image of a landmark may be required.

In one or more embodiments, there may be an inevitable tilt applied to the camera when users hold their smartphone. The tilt leads point sources to be projected on different points on the image plane. The tilt makes the situation different from the situation with zero tilt, i.e., when the camera is horizontal.

In local positioning, each landmark may be considered as a positioning cell. A user's location is measured with respect to the positioning cell based on the center of the landmark. The user's location may be a location of the smartphone. In order to cover a larger area, such as a library building, shopping center, etc., each cell may have a unique identifier.

In one or more embodiments of an indoor positioning system, the spatial arrangement of color LEDs in a landmark may create a cell identifier. Other parameters, such as illumination level and time-frequency domain may be used for VCL systems. As far as illumination is concerned, the color codes may be balanced.

In one or more embodiments, a number of different color LEDs namely red, green and blue may be equal in quantity. Equal number of red, green and blue LEDs may lead to almost white illumination from landmarks.

In one or more embodiments, with respect to azimuth consideration in local positioning, identifier codes and orientations should remain unique compared to other subset members as well as identifiers' transposed and mirrored versions.

For example, in a symmetric landmark, such as a square, the 90, 180, and 270 rotations of each code matrix may be unique.

In one or more embodiments, a specific header may be used in code for absolute compass direction. For example, a red row of LEDs in the north side of a square landmark or a red radius of LEDs toward the north in a circle landmark may address orientation concerns in a code design. However, in designing the rest of code matrices, the same red row in the other sides of the square or the same radius in the circle may be avoided.

In an example embodiment, a typical smartphone is used for capturing the images, measuring the applied tilt, image processing, and positioning algorithm calculations. Taking advantage of an ordinary front-facing camera with a resolution of 480×640 pixels and an accelerometer, industrial applications for indoor positioning systems may be achieved through common smartphones.

In one or more embodiments, LEDs may behave like reference points for positioning a smartphone.

In one or more embodiments, an error in location and/or position of the smartphone may be less than 6 cm. A camera may capture images at predetermined intervals. The intervals may be chosen by a user of the smartphone and/or hard coded into a mobile application.

Figure 5:
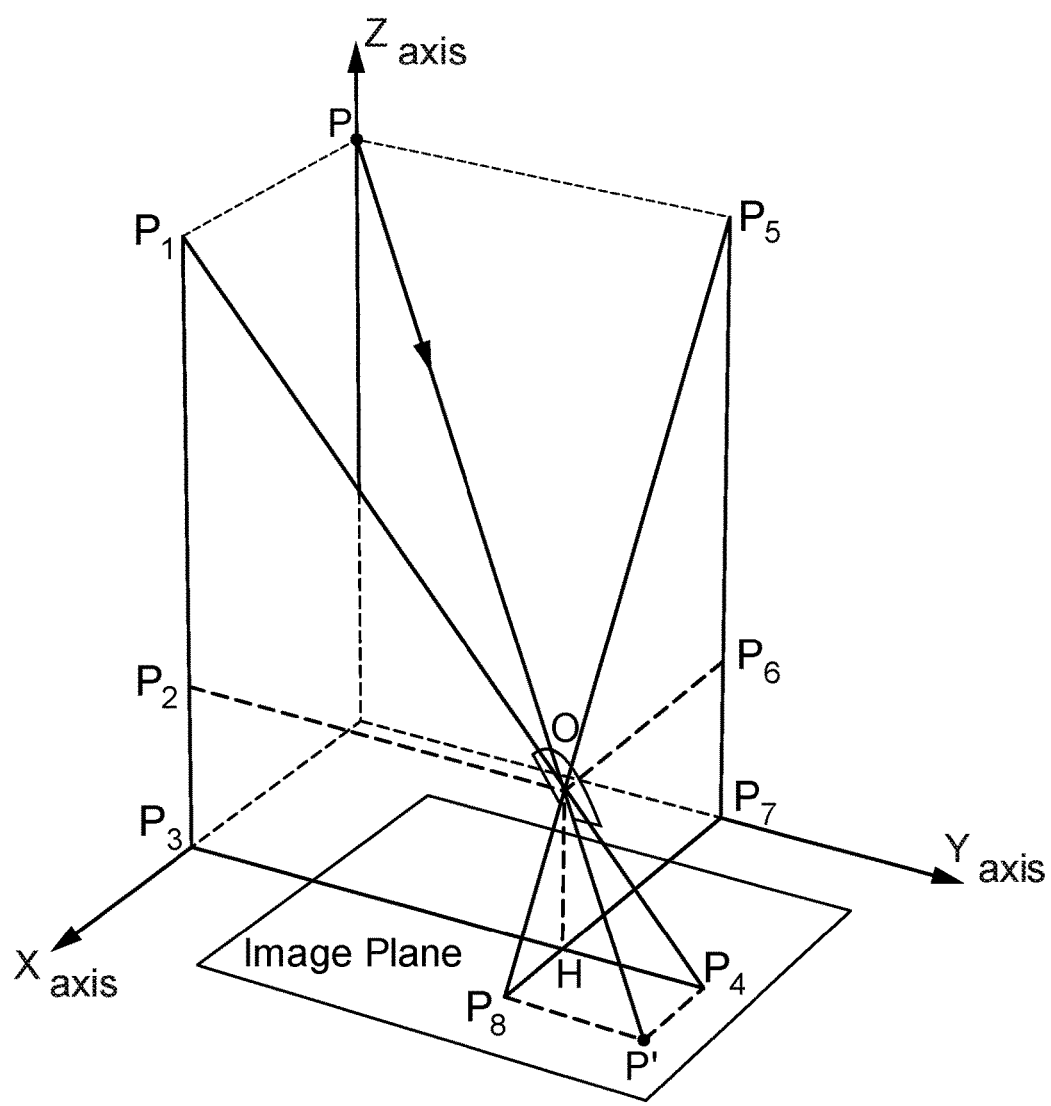
FIG. 5 is a diagrammatic representation of a 2-D magnified geometric scheme, according to one embodiment.

FIG. 5 is diagrammatic representation of a 2-D magnified geometric scheme, according to one embodiment. The projection of the lens's center on the image plane, H, may be the origin of the coordinate system. Assuming the point source P is in the camera's field of view (FOV), the projection of P on the camera's image plane, P', has coordinates ($P_8$, $P_4$) on the xy plane on the camera's coordinate system. The desired positioning parameters are the horizontal distance of P and O, namely X=$\overline{P_7H}$ and Y=$\overline{P_3H}$. In addition, Z=$\overline{P_1P_2}$=$\overline{P_5P_6}$ is the height of the smartphone with respect to P, which is known in 2-D positioning. The similarity of triangles $\overline{P_5P_6O}$ and $\overline{OHP_8}$ yields;

$$\frac{Z}{\overline{OH}} = \frac{X}{\overline{HP_8}} \quad (1)$$

Similarly, considering the similarity of $\overline{P_1P_2O}$ and $\overline{OHP_4}$, we obtain $$\frac{Z}{\overline{OH}} = \frac{Y}{\overline{HP_4}} \quad (2)$$

where $\overline{OH}=Z_c$, is the focal length of the camera.

Figure 6:
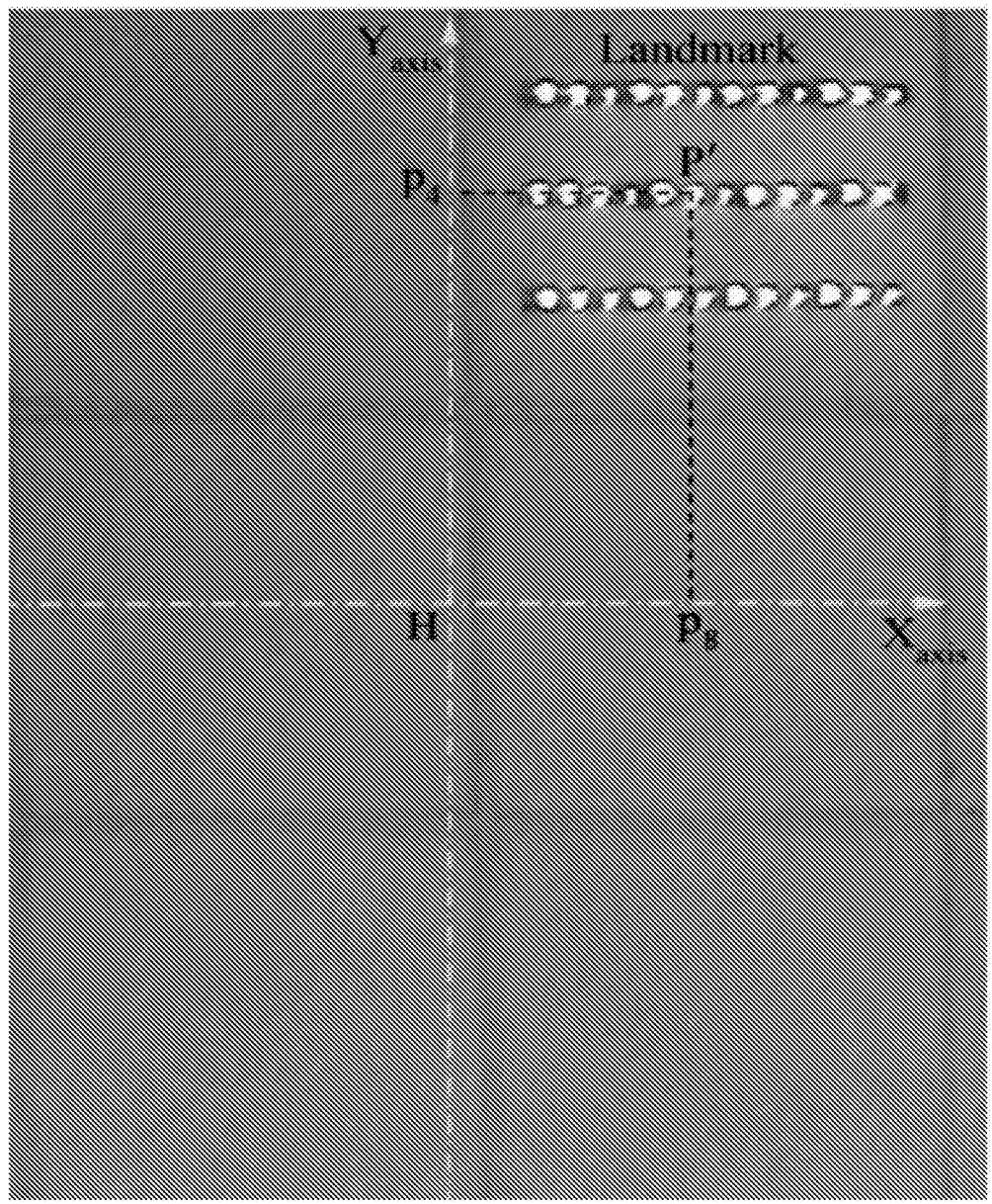
FIG. 6 is an exemplary image captured by a front facing camera, according to one embodiment.

FIG. 6 is an exemplary image captured by a front facing camera, according to one embodiment. FIG. 6 illustrates the captured image corresponding to the image plane in FIG. 5.

Considering that all the distances in the captured image are measured in pixels, the P' distance components from H, i.e., ($\overline{HP_8}$,$\overline{HP_4}$) can be defined as;

$$\overline{HP_8}=UP_x;$$

$$\overline{HP_4}=UP_y; \quad (3)$$

where U is a conversion constant in cm/pixel, $P_x$ and $P_y$ are the $\overline{P'H}$ components in pixels. In addition, $Z_c$ and U are constants that depend on camera parameters, and they must be calculated for each camera once. Ultimately, substituting (3) in (1) and (2), the desired parameters can be obtained as;

$$X = \frac{Z}{Z_c}P_xU; \quad (4)$$

$$Y = \frac{Z}{Z_c}P_yU;$$

which verifies the feasibility of 2-D positioning using only a single point source.

Figure 7:
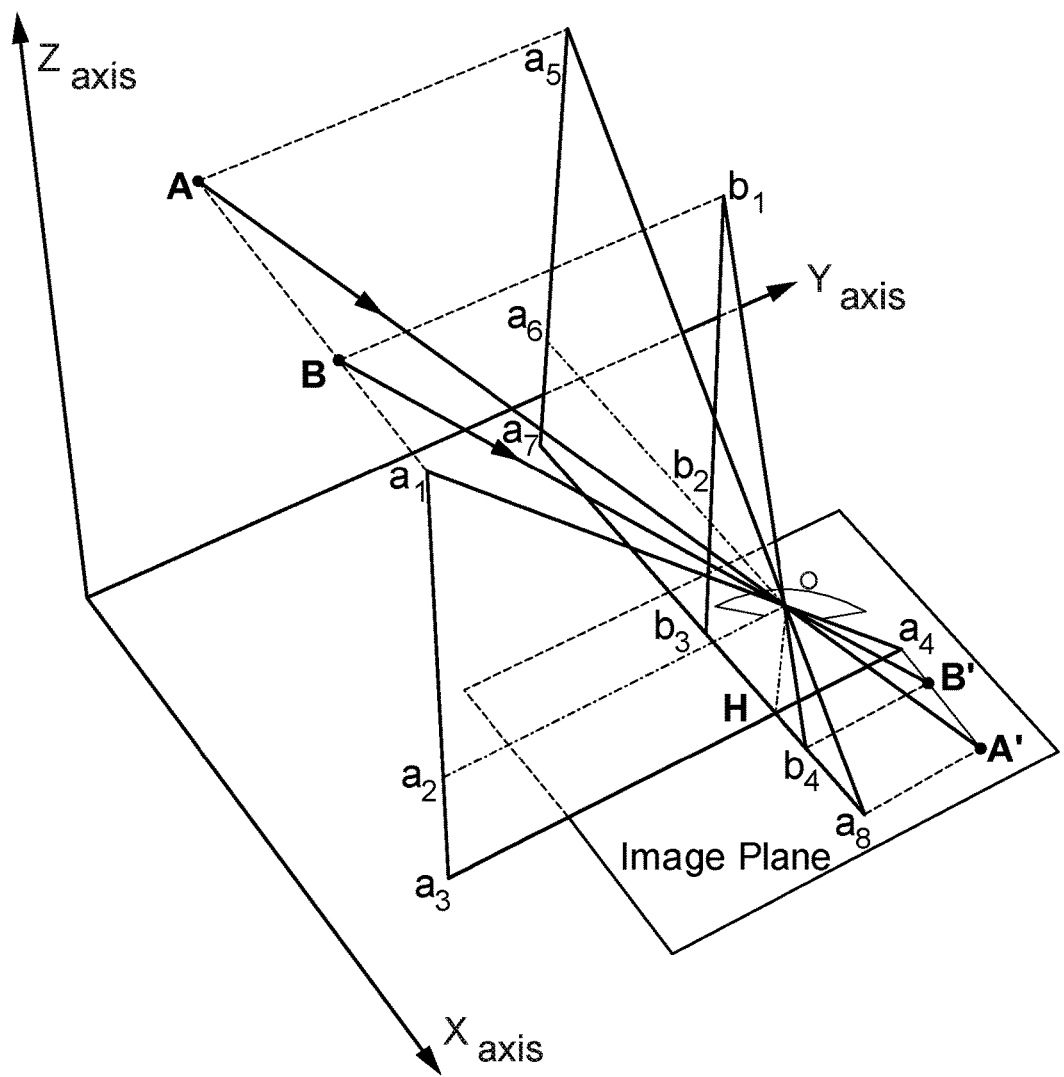
FIG. 7 shows a geometric scheme of 3-D positioning, according to one embodiment.

FIG. 7 shows the geometric scheme of 3-D positioning, according to one embodiment. In order to perform 3-D positioning, extraction of two point sources' coordinates in the captured image of a landmark is required. Let us first assume that the camera's azimuth is zero. Points A and B illustrate the extracted point sources with the same y and z components, i.e., $\overline{AB}$ is parallel to the X-axis. The projected points on the image plane, namely A' and B', have the same y but different x coordinates. Furthermore, considering zero roll and pitch for the camera, the Z-axis is orthogonal to the image plane. Accordingly, the room coordinate system shown in FIG. 7 is similar to the camera coordinate system, shown in FIG. 8.

Figure 8:
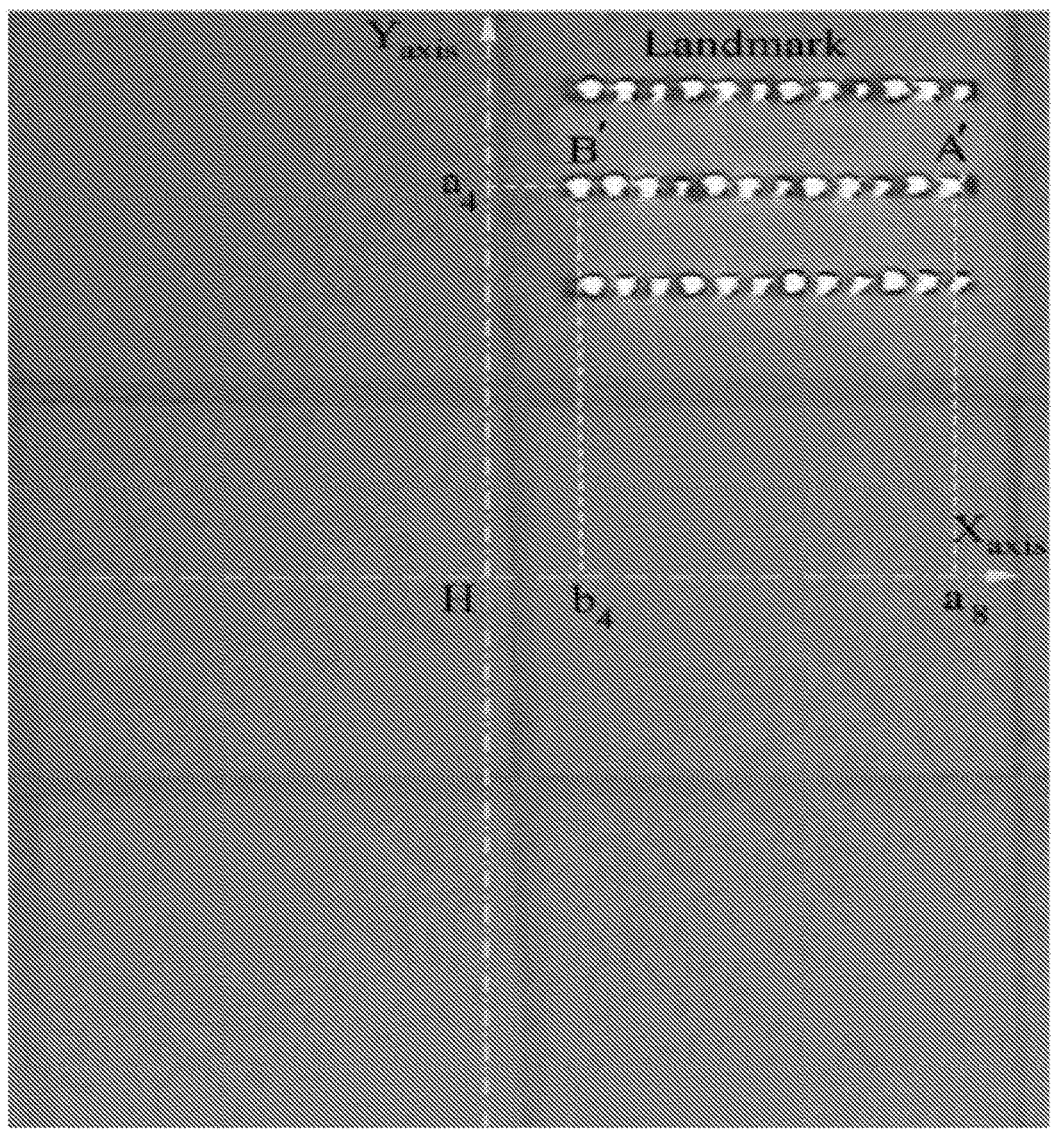
FIG. 8 shows a concept of 3-D positioning for a corresponding image captured by the front facing camera, according to one embodiment.

FIG. 8 shows a concept of 3-D positioning associated with FIG. 7 for a corresponding image captured by the front facing camera, according to one embodiment. The desired parameters of 3-D positioning are the components of $\overline{AO}$ distance, namely X=$\overline{a_7H}$, Y=$\overline{a_3H}$ and Z=$\overline{a_5a_6}$=$\overline{b_1b_2}$=$\overline{a_1a_2}$. In this scenario, there are similarities between three different triangles shown in FIG. 7. The subsequent distance relations can be derived as follows.

Step I: Since triangles $\overline{a_5a_6O}$ and $\overline{OHa_8}$ are similar, it can be seen that;

$$\frac{Z}{Z_c} = \frac{X}{p_{x_a}U} \quad (5)$$

Wherein, $Z_c$ and U are the conversion constants introduced in the 2-D positioning subsection. Furthermore, $p_{x_a}$ is the number of pixels between H and $a_8$ in the captured image.

Step II: The similarity between $\overline{b_1b_2O}$ and $\overline{OHb_4}$ yields;

$$\frac{Z}{Z_c} = \frac{X-L}{p_{x_b}U} \quad (6)$$

where L=$a_7b_3$ is the known fixed distance between the point sources A and B, which are located at a same landmark.

Similarly, $p_{x_b}$ is the number of pixels between H and $b_4$ in the captured image.

Step III: Considering the similarity of $\overline{a_1a_2O}$ and $\overline{OHa_4}$, we obtain;

$$\frac{Z}{Z_c} = \frac{Y}{p_y U};\qquad(7)$$

where $Y=\overline{a_3H}$. Solving the system of linear equations (5), (6) and (7), the desired parameters X, Y, and Z can be calculated as;

$$X = L\frac{p_{x_a}}{p_{x_a} - p_{x_b}}\qquad(8)$$

$$Y = L\frac{p_y}{p_{x_a} - p_{x_b}}$$

$$Z = LZ_c\frac{1}{U(p_{x_a} - p_{x_b})}$$

In the above 2-D and 3-D positioning algorithms, it is assumed that the camera has zero azimuth and tilt. In other words, the camera and room coordinate systems are the same. In this part, the positioning algorithms are generalized for different values of the camera's azimuth, when the camera coordinate system is oriented around the Z-axis with respect to the room coordinate system. For this purpose, the coordinates of two point sources, i.e., LEDs, in the captured image have to be extracted.

Figure 9:
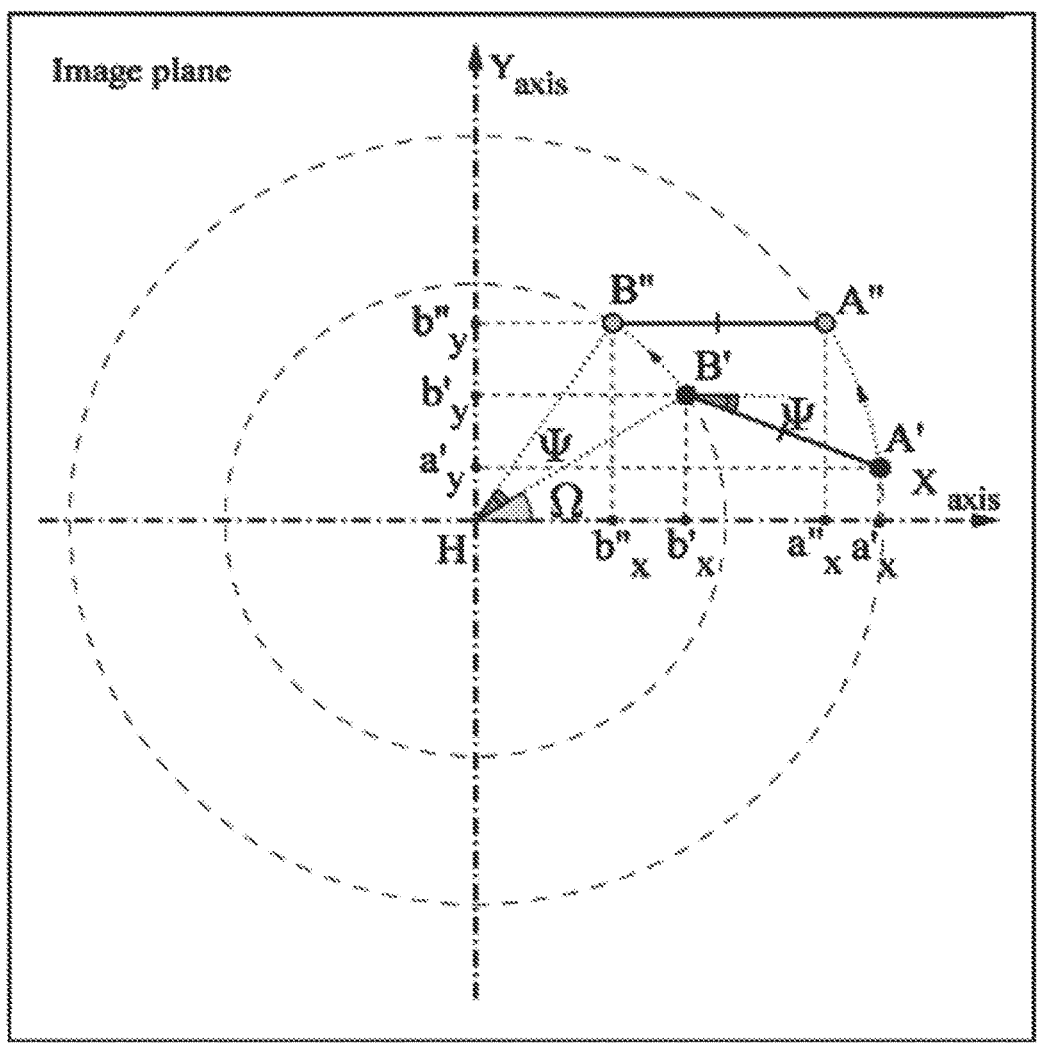
FIG. 9 demonstrates the azimuth calculation scheme, according to one embodiment.

FIG. 9 demonstrates the azimuth calculation scheme, according to one embodiment. The projected image of the point sources A and B on the image plane are A' and B', respectively, where $\overline{AB}$ is parallel to the X-axis of the room coordinate system. Considering that the camera is clockwise rotated by $\Psi$ degree, the segment A'B' and the X-axis of the camera coordinate system have $\Psi$ degree angle with respect to each other.

Therefore, it is necessary to apply a $\Psi$ degree rotation on A' and B' before employing the proposed 2-D and 3-D algorithms. Considering $$A'=(a'_x,a'_y);$$

$$B'=(b'_x,b'_y);$$

the rotation value, $\Psi$, can be obtained as $$\Psi = \tan^{-1}\left(\frac{b'_y - a'_y}{a'_x - b'_y}\right).\qquad(9)$$

Accordingly, the corresponding rotation of B', i.e., B''= $(b''_x,b''_y)$ can be calculated as;

$$r_1 = \sqrt{(b'_x - H_x)^2 + (b'_y - H_y)^2},\qquad(10)$$

$$\Omega = \tan^{-1}\frac{b'_y - H_y}{b'_x - H_x},$$

$$(b''_x, b''_y) = (r_1\cos(\Psi + \Omega), r_1\sin(\Psi + \Omega)),$$

where $r_1$ and $\Omega$ are the radius of rotation around $H=(H_x,H_y)$ and the initial angle, respectively. The corresponding rotation of A', i.e., $A''=(a''_x,a''_y)$, can also be calculated as $$r_2=\sqrt{(b'_y-a'_y)^2+(a'_x-b'_x)^2},\ (a''_x,a''_y)=(b''_x+r_2,b''_y),\qquad(11)$$

in which $r_2=\overline{A'B'}$.

$\Psi$ may be reported as the azimuth of the positioning device. A'' and B'' on the image plane are employed in the proposed positioning algorithms as the projection of the point sources A and B, respectively.

The other highly significant challenge of smartphone-based visible light positioning (VLP) systems is related to the tilt of the smartphone. In this part, we address this challenge via the virtual plane approach. In this regard, we employ an accelerometer, a built-in sensor that is available in most smartphones, in order to evaluate the smartphone's roll and pitch parameters used in virtual plane calculations.

In practice, there may be an inevitable tilt applied to the camera when users hold their smartphones. This leads point sources to be projected on different points on the image plane and thus different from the situation with zero tilt, i.e., when the camera is horizontal.

Figure 10:
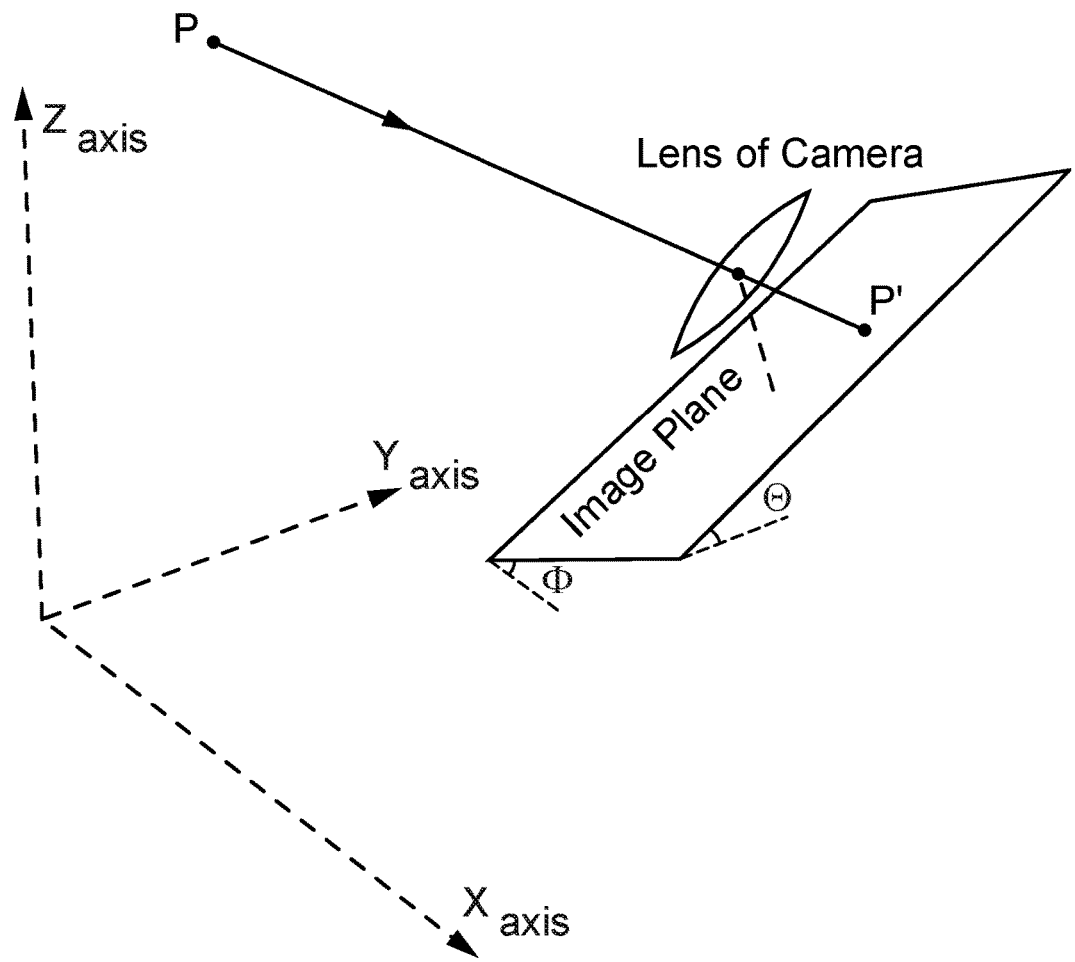
FIG. 10 illustrates a realistic inclination of a smartphone, according to one embodiment.

FIG. 10 illustrates a realistic inclination of a smartphone with $\Phi$ degree roll and $\Theta$ degree pitch. The point source P is in the camera FOV, hence its projected image, P', is located on the image plane.

Figure 11:
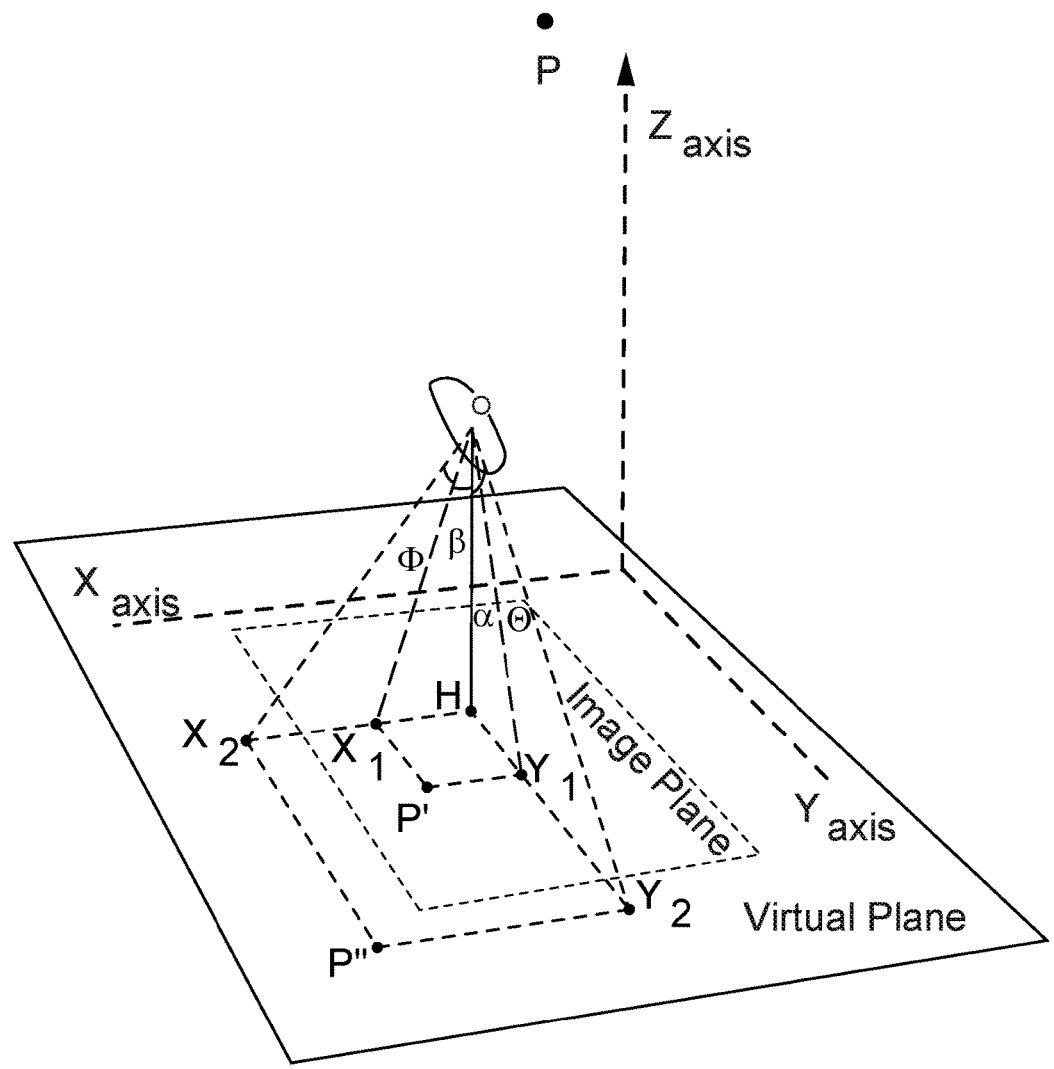
FIG. 11 illustrates the locations of P' on the image plane, according to one embodiment.

FIG. 11 illustrates the locations of P' on the image plane, where $\alpha$ and $\beta$ are the angles that the P beam vector makes with the xz and yz planes in the non-zero tilt situation, respectively. Now, assume the camera tilt is zero at the same location. In this case, the image of P is projected at P'' on the image plane and the aforementioned angles change to $\alpha+\Theta$ and $\beta+\Phi$ respectively. Therefore, in order to address the tilt problem in the proposed algorithm, the map vector from P' to P'' should be derived. Then, accurate positioning is possible, applying P'' as the projection of point source P in the positioning algorithms. As shown in FIG. 11, P'' might be located beyond the image plane due to the applied tilt compensation. The approach may be called a virtual plane, owing to its virtually broadened image plane. Point P'' may be a virtual projected point.

Considering $P'=(x_1,y_1)$ coordinates on the image plane, and are obtained as;

$$\alpha=\tan^{-1}(U(y_1-H_y)/\overline{OH}),$$

$$\beta=\tan^{-1}(U(x_1-H_x)/\overline{OH}),\qquad(12)$$

where $\overline{OH}=Z_c$ and U are constant parameters in cm introduced earlier. $H=(H_x,H_y)$ is the center point of the image plane in pixels and the $P''=(x_2,y_2)$ coordinates can be calculated as;

$$y_2=(Z_c/U)\tan(\alpha+\Theta)+H_y,$$

$$x_2=/(Z_c/U)\tan(\beta+\Phi)+H_x,\qquad(13)$$

in which the roll and pitch angles are extracted using the accelerometer of the smartphone as follows;

$$\Phi=\sin^{-1}(\varphi/9.8),$$

$$\Theta=\sin^{-1}(\theta/9.8),\qquad(14)$$

where $\varphi$ and $\theta$ are the smartphone acceleration along y and x axes in m/s$^2$, respectively, and 9.8 is the gravity acceleration. Eventually, P'' is a valid point for the proposed 2-D positioning algorithm. In order to perform 3-D positioning, it is necessary to compensate the coordinates of the projected image of two point sources of the same landmark.

The virtual plane approach addresses the tilt issues reported in most AOA-based methods, where it gives flexibility to the user's hand gesture and guarantees localization accuracy even if the user's hand trembles. Moreover, tilt compensation broadens the system FOV, which is the most critical issue in AOA-based methods. In other words, by intentionally applying the tilt, the point source P appears in the FOV of the positioning system.

In the local positioning, we considered each landmark as a positioning cell in which the user's location is measured based on the center of the landmark. In order to cover a larger area, such as a library building, shopping center, etc., each cell should have a unique identifier.

In the local positioning, we considered each landmark as a positioning cell in which the user's location is measured based on the center of the landmark. In order to cover a larger area, such as a library building, shopping center, etc., each cell has a unique identifier. In the proposed indoor positioning system, the spatial arrangement of color LEDs in the landmark creates the cell identifier, and the other parameters, such as illumination level and time-frequency domain are reserved for visible light communications (VLC). As far as illumination is concerned, the color codes should be balanced. This means that the number of different color LEDs namely red, green and blue should be equal, which leads to almost white illumination from landmarks.

The other point on the code design has to do with the azimuth consideration in local positioning. The identifier codes and their orientations should remain unique compared to other subset members as well as their transposed and mirrored versions. For example, in a symmetric landmark, such as a square, the 90°, 180°, and 270° rotations of each code matrix are also unique. One of the most applicable approaches for simplifying orientation constraints is using a specific header in the code for absolute compass direction. For example, a red row of LEDs in the north side of a square landmark or a red radius of LEDs toward the north in a circle landmark handles orientation concerns in the code design. However, in designing the rest of the code matrices, the same red row in the other sides of the square or the same radius in the circle must be avoided.

In one or more embodiments, in local positioning, each landmark may be considered as a positioning cell in which the user's location is measured based on the center of the landmark. Now, in global positioning, in order to cover a larger area, such as a library building, shopping center, etc., each cell may have a unique identifier. In indoor positioning system, spatial arrangement of color LEDs in the landmark creates a cell identifier, and the other parameters, such as illumination level and time-frequency domain are reserved for VLC. As far as illumination is concerned, the color codes may be balanced. Therefore, the number of different color LEDs namely red, green and blue should be equal, which leads to almost white illumination from landmarks.

The other point on the code design has to do with the azimuth consideration in local positioning. The identifier codes and identifier orientations may remain unique compared to other subset members as well as transposed and mirrored versions of the identifier codes and identifier orientations. For example, in a symmetric landmark, such as a square, 90°, 180°, and 270° rotations of each code matrix may be unique. One of the most applicable approaches for simplifying orientation constraints may be using a specific header in the code for absolute compass direction. For example, a red row of LEDs in the north side of a square landmark or a red radius of LEDs toward the north in a circle landmark may handle orientation concerns in the code design. However, in designing the rest of the code matrices, the same red row in the other sides of the square or the same radius in the circle must be avoided.

In an example embodiment, in order to evaluate the scalability of spatial color code identifiers, calculate the number of typical M×N rectangular unique identifiers. In this case, a red row of LEDs with a length of N is considered as an orientation header on one side of the landmark. Furthermore, in order to provide white color illumination, an equivalent number of each color, namely, $$\frac{M \times N}{3}$$

number of red, $$\frac{M \times N}{3}$$

number of green, and $$\frac{M \times N}{3}$$

number of blue should be used in the landmarks. Hence, the number of aforementioned unique identifiers U.I. in the remaining (M−1)×N code points is obtained as:

$$U.I. = \frac{((M-1)N)!}{\left(\frac{(M-3)N}{3}\right)!\left(\frac{M \times N}{3}\right)!\left(\frac{M \times N}{3}\right)!} - \frac{((M-2)N)!S(M-6)}{\left(\frac{(M-6)N}{3}\right)!\left(\frac{M \times N}{3}\right)!\left(\frac{M \times N}{3}\right)!} \quad (15)$$

where the first term is the number of permutations of the multiset $$\left\{\frac{(M-3)N}{3}\text{reds}, \frac{M \times N}{3}\text{greens}, \frac{M \times N}{3}\text{blues}\right\}$$

in the rest of (M−1)×N codes points. Similarly, the latter term is permutations of the multiset $$\left\{\frac{(M-6)N}{3}\text{reds}, \frac{M \times N}{3}\text{greens}, \frac{M \times N}{3}\text{blues}\right\},$$

applying the orientation constraint, and eliminating codes with the red row in both sides. S(n) is the discrete step unit function defined as S(n≥0)=1 and S(n<0)=0. For a 6×3 landmark, there are 419496 unique identifiers. Hence, the system is significantly scalable in comparison to other systems with a limited number of identifiers.

Experimental Setup: The prototype system of the proposed indoor positioning algorithm may be implemented using a setup of LED luminaries and a typical smartphone. The luminary setup consists of four color LED landmarks assembled in a cubicle 5×5×3 m$^2$ in size. Given the proposed algorithm may not require any LED modulation, unmodified commercial LED luminaries may be used. However, LED drivers may be designed with modulation capability for developing a hybrid communication and positioning system. A typical smartphone is used for capturing the images, measuring the applied tilt, image processing, and positioning algorithm calculations. Taking advantage of an ordinary front-facing camera with a resolution of 480×640 pixels and an accelerometer, which are available in smartphones, justifies the stability of the system for commercial applications.

Figure 12:
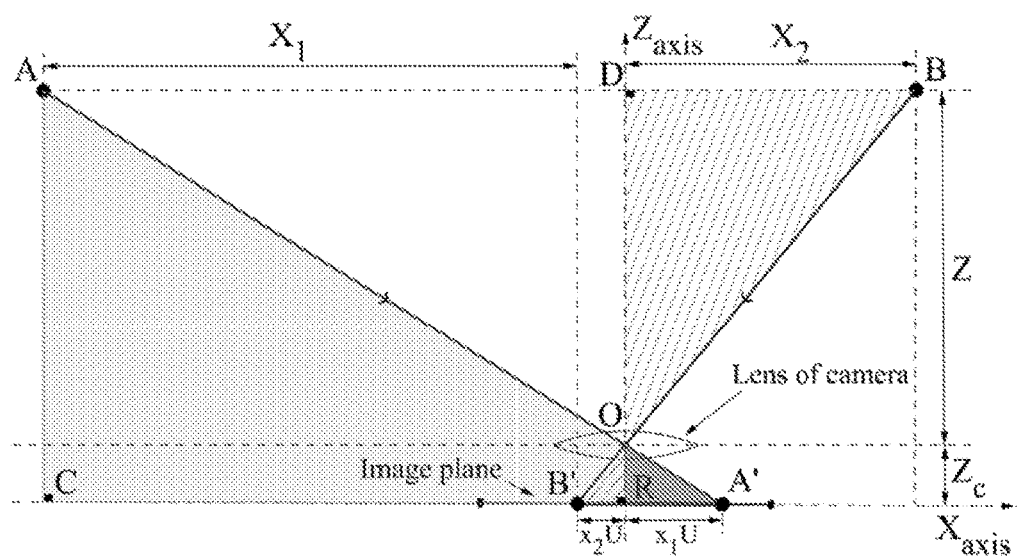
FIG. 12 demonstrates one embodiment for calculating parameters of the camera.

Calibration: In order to employ the geometrical Optics positioning algorithm (GOPA) on different smartphones, the camera parameters of each smartphone, namely U and $Z_c$ may be calculated once. In this regard, the camera may be held in a specific location with known Z and X. FIG. 12 illustrates the calibration setup, where A and B are the extracted point sources located on the ceiling with the same height, Z. A' and B' are the projected images of A and B on the camera's image plane. Considering the similarity of triangles $\overline{ACA'}$ and $\overline{ORA'}$, we can obtain;

$$\frac{Z}{Z_c} = \frac{X_1 + x_2 U}{x_1 U}. \quad (16)$$

In the same way, triangles $\overline{BDO}$ and $\overline{ORB'}$ are similar, and thus;

$$\frac{Z}{Z_c} = \frac{X_2}{x_2 U}. \quad (17)$$

According to (16) and (17), U and $Z_c$ can be calculated as;

$$U = \frac{X_2 x_1 - X_1 x_2}{x_2^2}, \quad (18)$$
$$Z_c = Z\frac{X_2 x_1 - X_1 x_2}{X_2 x_2},$$

where $x_1$ and $x_2$ are measured in the captured image in pixels.

Experimental Results: The desired positioning variables that may be evaluated are X, Y, Z, azimuth, roll, and pitch. In all of the results, the position error may be defined as the Euclidean distance between the real position and its corresponding measured one.

Figure 13A:
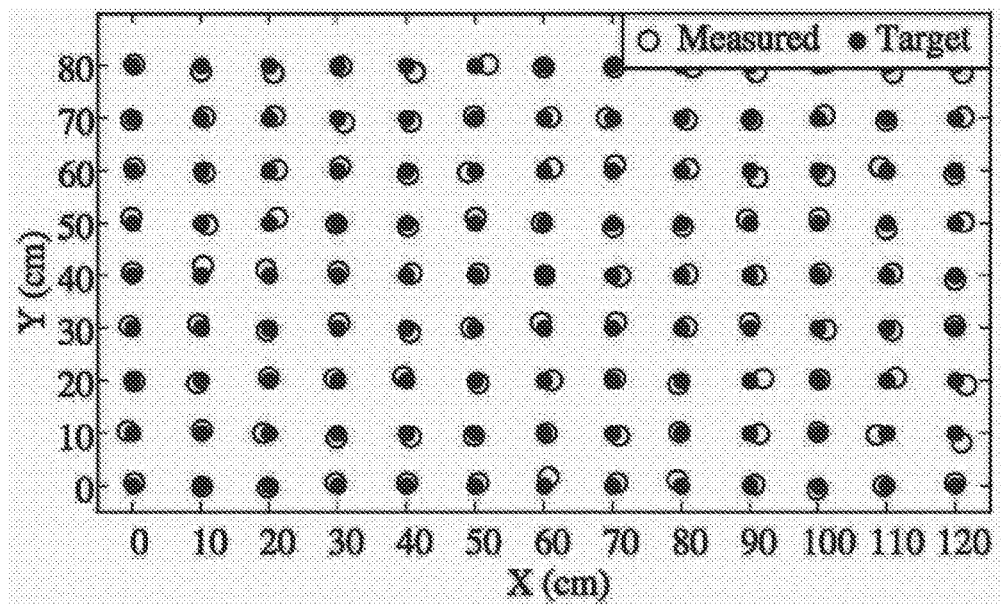
FIG. 13A illustrates the xy plane measurement patterns of the 2-D positioning algorithm.

In an example embodiment, the measurement results of the 2-D positioning algorithm is illustrated. The local positioning measurements are done in an 120×80 cm$^2$ area with a vertical distance of 220 cm below a landmark, as it is shown in FIG. 13A. The camera has 90° azimuth without any applied tilt.

Figure 13B:
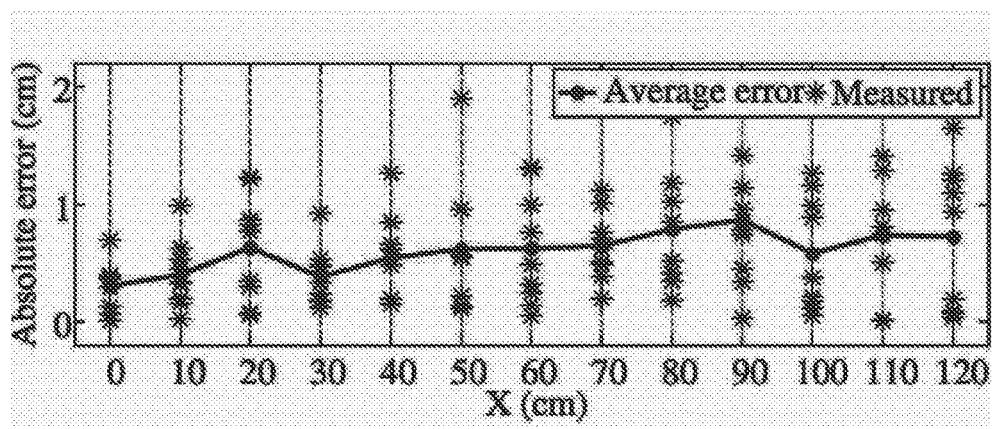
FIG. 13B illustrates the 2-D positioning error as a function of X.
Figure 13C:
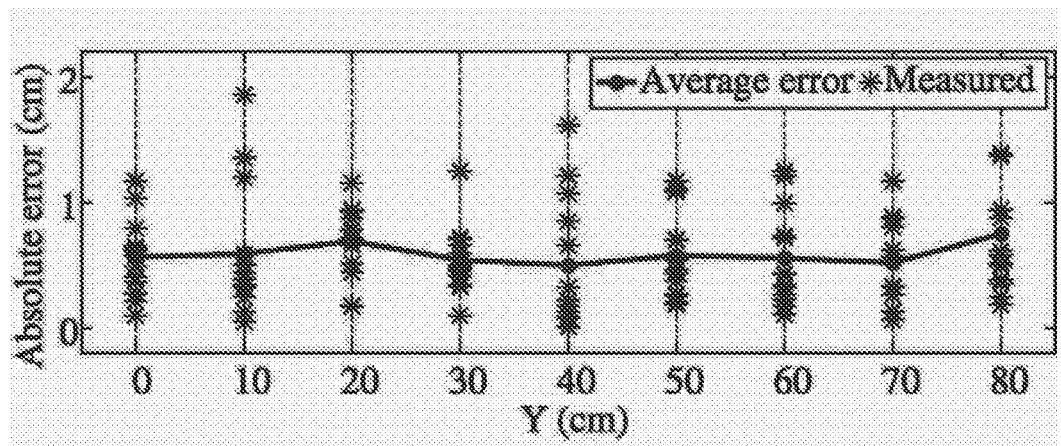
FIG. 13C illustrates the 2-D positioning error as a function of Y.

The 2-D positioning error is defined as $D_{err\text{-}2D} = \sqrt{(x_m - x_t)^2 + (y_m - y_t)^2}$, where $(x_t, y_t)$ and $(x_m, y_m)$ are the coordinates of the target point and the measured point, respectively. FIGS. 13B and 13C present the 2-D positioning error as a function of X and Y, respectively. The average 2-D positioning error in a positioning cell zone is 0.54 cm. In the 3-D positioning scenario, the error may be defined as $D_{err\text{-}3D} = \sqrt{(x_m - x_t)^2 + (y_m - y_t)^2 + (z_m - z_t)^2}$, where $(x_t, y_t, z_t)$ and $(x_m, y_m, z_m)$ are the coordinates of the target point and the measured point, respectively.

Figure 13D:
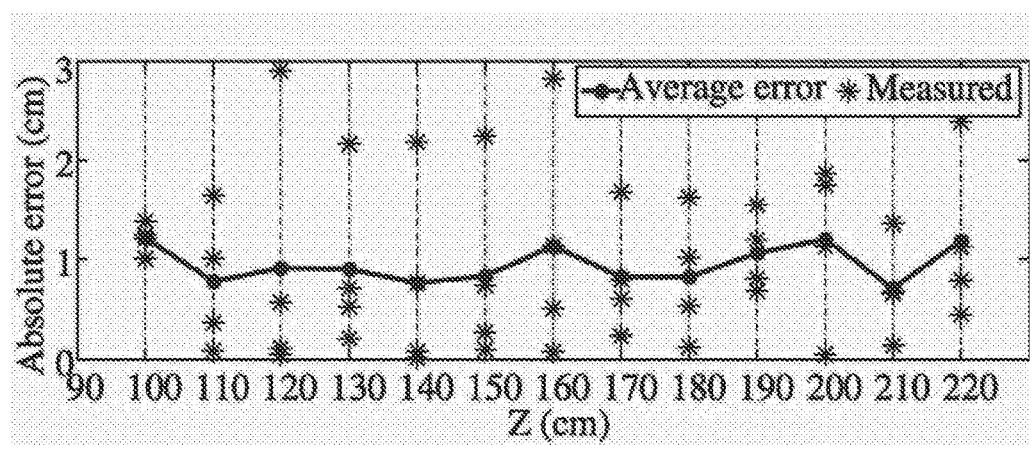
FIG. 13D illustrates 3-D positioning error versus Z.

Given that 2-D and 3-D positioning algorithms may have the same calculations for X and Y parameters, the sensitivity of the 3-D positioning algorithm to X and Y parameters is similar to the 2-D positioning algorithm. In other words, both the 2-D and 3-D positioning errors are almost constant for different horizontal distances from the landmark. In order to evaluate the vertical distance parameter, namely Z, measure the position error on the perimeter of the circle with 1 meter radius. In addition, consider different heights ranging from 110 cm to 220 cm with respect to the ceiling. FIG. 13D depicts the 3-D positioning error versus Z. Similarly, the mean 3-D positioning error remains almost constant for different values of Z.

FIG. 13A illustrates xy plane measurement patterns. FIG. 13B Position error at location (X,Y,220). The measured (X,Y) may be averaged over different Ys in order to illustrate algorithm sensitivity to X values. FIG. 13C Position errors at location (X,Y,220). The measured (X,Y)s may be averaged over different Xs in order to illustrate the algorithm sensitivity to Y values. FIG. 13D Position errors at location (X,Y,Z), where X and Y belong to the perimeter of a circle with 1 meter radius. The measured (X,Y,Z) are averaged over different heights to illustrate the algorithm sensitivity to Z values.

Figure 14A:
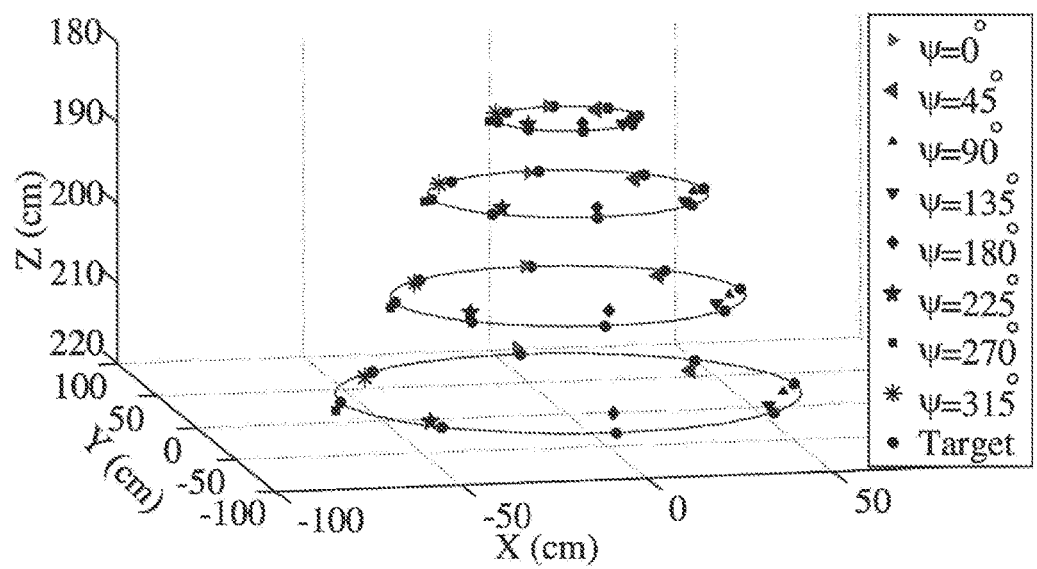
FIG. 14A illustrates an experiment done by measuring the azimuth angles on the perimeter of the circles for different heights.
Figure 14B:
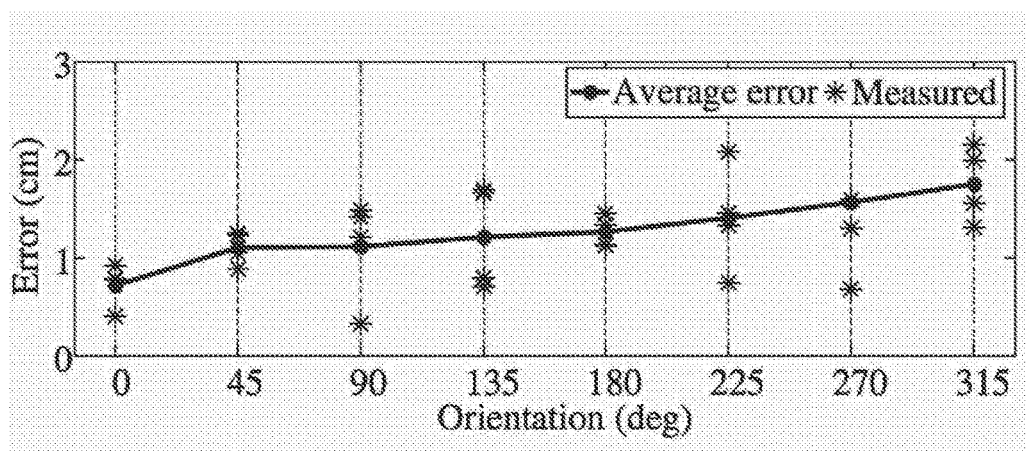
FIG. 14B illustrates a slight increase of mean positioning error by the azimuth angle enhancement.

FIGS. 14A and 14B illustrate the performance of GOPA for different values of azimuth. In this experiment, measurements may be taken for 8 azimuth angles on the perimeter of the circles for 4 different heights (see FIG. 14A). The mean positioning error may increase slightly by the azimuth enhancement as it is shown in FIG. 14B. The increase may be because the azimuth mapping error grows for higher azimuth degrees.

The results may be obtained for different values of roll and pitch, respectively. One may conclude that the average positioning error is increased by increasing roll and pitch due to the tilt mapping error. Increase in average positioning error may occur because the image plane resolution is confined by the size of pixels. On the other hand, the larger the applied tilt to the image plane, the farther the virtual projected point, P", is located, i.e., the longer tilt mapping vector. Accordingly, a pixel-level displacement error on the tilted image plane brings about a large displacement error in the virtual projected point proportional to the tilt value. In practice, the applied tilt of the smartphone would not go beyond 35°, while the user is looking at the display. Hence, in the worst case, the average positioning error may be less than 6.02 cm.

Figure 16:
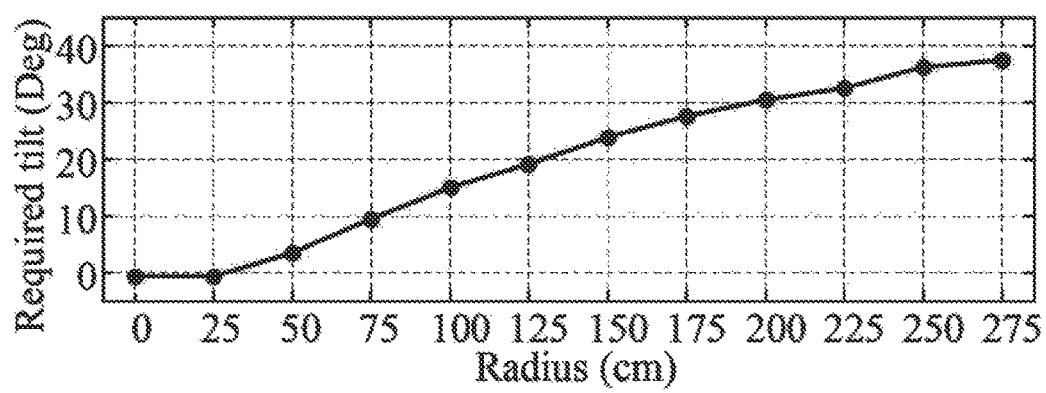
FIG. 16 illustrates the tilt of the smartphone per radius from the landmark center for addressing the camera FOV issue.

Another benefit of considering tilt is the enhancement of the camera FOV may lead to a larger positioning cell area. FIG. 16 illustrates the required tilt versus the positioning cell radius that is measured in 220 cm vertical distance from the ceiling. The cell radius can be increased up to 275 cm, applying 35° tilt to the camera. In this case, 3-D positioning error is less than 6.02 cm (see FIG. 16). Finally, FIG. 15 summarizes the performance, and the potential applications of GOPA.

By closed form equations, relevant equations include: Eq. 4 for 2-D positioning, Eq. 8 for 3-D positioning, Eq. 11 for calculating azimuth, and Eq. 14 for calculating the applied tilt to the locator device. As a consequence, there is no need to use the complex and time consuming optimization algorithms. The closed formed equations simplify the positioning procedure.

In one embodiment of the proposed positioning method, the color LEDs within a landmark are not modulated (they are only turned on); as a consequence, they can be simultaneously modulated for visible light communication (VLC) applications. Therefore, a hybrid positioning and communication system is able to be realized.

In one or more embodiments, positioning systems may have many commercial applications such as robotics, advertising, device monitoring, user navigation and so on. Robotics: By embedding the smartphone in a robot, a robot may go to specific three dimensional destinations determined by a user. Advertisement: In order to guide clients in a shopping center to specific locations, one can utilize the indoor positioning system described herein. Device Monitoring: exact and real time locations of some devices such as patients' wheelchairs in a hospital can be monitored. User Navigation: similar to global positioning system (GPS) applications in outdoor environments, the proposed indoor positioning system may be used for guiding people.

One aspect of the present disclosure is directed to an indoor localization system. The localization system comprises one or more color LEDs, wherein the one or more LEDs are installed on the ceiling of an indoor location; and a smartphone associated with at least one of a camera, an accelerometer and a processor. The indoor location may be divided based on the one or more color LED identifiers into one or more cells. In addition, one or more images of the one or more color LED identifiers can be captured through the camera associated with the smartphone. The accelerometer data associated with the smartphone may be captured onto a memory associated with the smartphone. At least one of the accelerometer data and captured images can be transmitted over a computer network to a computer processor. One or more of the following are calculated: the location in one or more cells, azimuth and tilt associated with the smartphone. The method further comprises determining the location of the smartphone within the cell based on an identified cell of the one or more cells. This location can be the 2D or the 3D location of the smartphone.

A two dimensional positioning may be based on one LED. A three dimensional positioning may be based on two or more light emitting diodes. The one or more LEDs may act as reference points. The images may be captured through the camera at predetermined intervals. An error in location of the smartphone may be less than 6 centimeters.

Although the present embodiments have been described with reference to specific example embodiments, it will be evident that various modifications and changes may be made to these embodiments without departing from the broader spirit and scope of the various embodiments. For example, various devices and modules described herein may be enabled and operated using hardware circuitry, firmware, software, or any combination of hardware, firmware, and software (e.g., embodied in a machine-readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a digital optical disc data storage, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A method of indoor localization associated with a smartphone comprising:
    installing one or more color LED identifiers on the ceiling associated with an indoor location;
    dividing the indoor location based on the one or more color LED identifiers into one or more cells;
    capturing one or more images of the one or more color LED identifiers through a camera associated with the smartphone;
    capturing accelerometer data associated with the smartphone onto a memory associated with the smartphone;
    estimating and compensating a tilt and an azimuth in the positioning of the smartphone using the captured images and accelerometer data through closed form equations;
    transmitting at least one of the accelerometer data and captured images over a computer network to a computer processor;
    calculating at least one of a location in one or more cells, azimuth and tilt associated with the smartphone; and
    determining the 2-D or 3-D location of the smartphone within the cell based on geometrical optics positioning algorithm within an identified cell of the one or more cells.

2. The method of claim 1, wherein the images are captured through the camera at a predetermined interval.

3. The method of claim 1, wherein a two dimensional positioning is based on the geometrical optics positioning algorithm within one or more light emitting diode.

4. The method of claim 1, wherein a three dimensional positioning is based on the geometrical optics positioning algorithm within two or more LEDs.

5. The method of claim 1, wherein the one or more LEDs within each cell include a set of LED identifiers, wherein the set of LED identifiers are reference points.

6. The method of claim 1, wherein an error in the location of the smartphone is less than 6 centimeters.

7. A method of indoor positioning associated with a smartphone comprising:
    installing one or more color LED identifiers on a ceiling associated with an indoor location;
    dividing the indoor location based on the one or more color LED identifiers into one or more cells;
    capturing one or more images of the one or more color LED identifiers through a camera associated with the smartphone;
    capturing accelerometer data associated with the smartphone onto a memory associated with the smartphone;
    estimating and compensating a tilt and an azimuth in the positioning of the smartphone using the captured images and accelerometer data through closed form equations;

transmitting at least one of the accelerometer data and captured images over a computer network to a computer processor;

calculating, through the computer processor, at least one of a location in one or more cells, azimuth and tilt associated with the smartphone, wherein the computer processor calculates at least one of a location in one or more cells, azimuth and tilt associated with the smartphone through closed form equations; and determining the location of the smartphone within the cell based on geometrical optics positioning algorithm within an identified cell of the one or more cells, wherein an error in the determined location is less than 6 centimeters.

8. The method of claim 7, wherein the images are captured through the camera at a predetermined interval.

9. The method of claim 7, wherein a two dimensional positioning is based on geometrical optics positioning algorithm within one or more light emitting diode.

10. The method of claim 7, wherein a three dimensional positioning is based on the geometrical optics positioning algorithm within two or more LEDs.

11. The method of claim 7, wherein the one or more LEDs within each cell include a set of LED identifiers, wherein the set of LED identifiers are reference points.

12. A method of determining the three dimensional position of a smartphone to within 6 centimeters of the actual position of the smartphone inside a building, said method comprising:

installing one or more color LED identifiers on one or more walls or ceiling inside said building;

based on one or more color LED identifiers, dividing an indoor location into one or more cells;

capturing one or more images of the one or more color LED identifiers through a camera associated with the smartphone;

capturing accelerometer data associated with the smartphone onto a memory associated with the smartphone;

estimating and compensating a tilt and an azimuth in the positioning of the smartphone using the captured images and accelerometer data through closed form equations;

transmitting at least one of the accelerometer data and captured images over a computer network to a computer processor;

calculating, through the computer processor, at least one location in one or more cells, azimuth and tilt associated with the smartphone, wherein the computer processor calculates at least one location in one or more cells, azimuth and tilt associated with the smartphone through closed form equations; and determining the three dimensional position of the smartphone within the cell based on geometrical optics positioning algorithm within an identified cell of the one or more cells, wherein an error in the determined location is less than 6 centimeters.

13. The method of claim 12, wherein a three dimensional positioning is based on the geometrical optics positioning algorithm within two or more LEDs.

14. The method of claim 12, wherein the one or more LEDs within each cell include a set of LED identifiers, wherein the set of LED identifiers are reference points.

15. The method of claim 12, wherein a three dimensional positioning is based on the geometrical optics positioning algorithm within two or more LEDs; wherein the one or more LEDs within each cell include a set of LED identifiers, wherein the set of LED identifiers are reference points; wherein azimuth and the tilt are calculated based on the captured image and accelerometer data.

* * * * *